United States Patent
Arlitt et al.

(10) Patent No.: US 11,683,327 B2
(45) Date of Patent: Jun. 20, 2023

(54) DEMAND MANAGEMENT OF SENDER OF NETWORK TRAFFIC FLOW

(71) Applicant: MICRO FOCUS LLC, Santa Clara, CA (US)

(72) Inventors: Martin Arlitt, Calgary (CA); Alkiviadis Simitsis, Santa Clara, CA (US)

(73) Assignee: Micro Focus LLC, Santa Clara, CA (US)

( * ) Notice: Subject to any disclaimer, the term of this patent is extended or adjusted under 35 U.S.C. 154(b) by 184 days.

(21) Appl. No.: 16/936,868

(22) Filed: Jul. 23, 2020

(65) Prior Publication Data

US 2022/0030011 A1    Jan. 27, 2022

(51) Int. Cl.
    *H04L 29/06*    (2006.01)
    *H04L 9/40*     (2022.01)

(52) U.S. Cl.
    CPC ...... *H04L 63/1416* (2013.01); *H04L 63/0236* (2013.01); *H04L 63/1425* (2013.01); *H04L 63/1491* (2013.01); *H04L 63/166* (2013.01); *H04L 63/168* (2013.01); *H04L 63/20* (2013.01)

(58) Field of Classification Search
    CPC ............ H04L 63/1416; H04L 63/0236; H04L 63/1425; H04L 63/1491; H04L 63/166; H04L 63/168; H04L 63/20; H04L 63/1458
    See application file for complete search history.

(56) References Cited

U.S. PATENT DOCUMENTS

| | | | | |
|---|---|---|---|---|
| 6,751,668 B1* | 6/2004 | Lin | ..................... | H04L 63/0227 709/227 |
| 6,772,196 B1* | 8/2004 | Kirsch | ................... | H04L 69/22 707/999.005 |
| 7,464,407 B2* | 12/2008 | Nakae | ................ | H04L 63/1408 713/188 |
| 7,818,795 B1* | 10/2010 | Arad | ................... | H04L 63/1408 726/13 |
| 8,272,044 B2* | 9/2012 | Ansari | ............... | H04L 63/1416 713/153 |
| 9,985,898 B2 | 5/2018 | Ramaiah et al. | | |
| 10,581,914 B2 | 3/2020 | Krauss et al. | | |

(Continued)

FOREIGN PATENT DOCUMENTS

| CN | 1855847 A | * 11/2006 | ............ H04L 63/08 |
|---|---|---|---|
| CN | 109347794 A | * 2/2019 | |

(Continued)

OTHER PUBLICATIONS

Wang, R. et al., "A Novel Method for Filtering Internet Background Radiation Traffic", 2013 Fourth International Conference on Emerging Intelligent Data and Web Technologies.

(Continued)

*Primary Examiner* — John B King
(74) *Attorney, Agent, or Firm* — Michael Dryja (57) ABSTRACT

A network traffic flow is directed to a computing services system is determined as being unrelated to the service that the system provides. In response, the network traffic flow is deflected away from the computing services system. Demand of the sender of the network traffic flow is managed by shaping the deflected network traffic flow in responding to the sender and/or by misinforming the sender in responding to the sender.

20 Claims, 8 Drawing Sheets

(56) References Cited

U.S. PATENT DOCUMENTS

| | | | |
|---|---|---|---|
| 2002/0066034 A1* | 5/2002 | Schlossberg | H04L 63/1416 726/23 |
| 2005/0152375 A1* | 7/2005 | An | H04L 47/29 370/395.41 |
| 2006/0168033 A1* | 7/2006 | Cai | G06Q 10/107 709/206 |
| 2007/0022479 A1* | 1/2007 | Sikdar | H04L 63/0218 726/25 |
| 2007/0258463 A1* | 11/2007 | Rhoades | H04L 67/1008 370/395.52 |
| 2008/0320585 A1* | 12/2008 | Ansari | H04L 63/1416 726/13 |
| 2010/0246401 A1* | 9/2010 | Woundy | H04L 47/11 370/236 |
| 2011/0119761 A1* | 5/2011 | Wang | G06F 21/55 726/23 |
| 2011/0213869 A1* | 9/2011 | Korsunsky | G06F 21/55 709/223 |
| 2011/0320617 A1* | 12/2011 | Annamalaisami | H04L 63/166 709/228 |
| 2014/0189074 A1* | 7/2014 | Parker | H04L 41/0893 709/220 |
| 2015/0180769 A1* | 6/2015 | Wang | H04L 45/38 370/236 |
| 2016/0029349 A1* | 1/2016 | Vargantwar | H04W 74/0833 370/329 |
| 2016/0381048 A1* | 12/2016 | Zhao | H04L 63/1416 726/23 |
| 2018/0103060 A1* | 4/2018 | Li | H04L 47/25 |
| 2020/0162484 A1 | 5/2020 | Solis Agea et al. | |
| 2020/0228538 A1* | 7/2020 | Soule | H04L 63/101 |
| 2021/0203688 A1* | 7/2021 | Ghule | H04L 69/22 |

FOREIGN PATENT DOCUMENTS

| | | | | |
|---|---|---|---|---|
| CN | 111385236 A | * | 7/2020 | |
| WO | WO-0225402 A2 | * | 3/2002 | H04L 63/1458 |
| WO | WO-2004112323 A1 | * | 12/2004 | H04L 47/10 |

OTHER PUBLICATIONS

Zave, P. et al. "Patterns and Interactions in Network Security", Jan. 1, 2020.

Xu, K. et al, "Reducing Unwanted Traffic in a Backbone Network", USENIX Association, SRUTI '05: Steps to Reducing Unwanted Traffic on the Internet Workshop, 2005.

Puska, A. et al., "Unwanted Traffic Characterization on IP Networks by Low Interactive Honeypot", NR2—Federal University of Parana, Brazil, 2014.

Mishra, A. et al., "The Great Internet TCP Congestion Control Census", Proceedings of the ACM on Measurement and Analysis of Computing Systems, vol. 3, No. 3, pp. 45:1-45:24.

Savage, S., "Sting: a TCP-based Network Measurement Tool", Proceedings of the 2nd USENIX Symposium on Internet Technologies and Systems (USITS), Boulder, CO, pp. 71-79, Oct. 1999.

Savage. S. et al., "TCP Congestion Control with a Misbehaving Receiver", ACM SIGCOMM Computer Communication Review, 29(5):71-78, Oct. 1999.

Gellings, C., "The concept of demand-side management for electric utilities", Proceedings of the IEEE, vol. 73, No. 10, pp. 1468-1470, Oct. 1985.

Ping, R. et al., "Characteristics of Internet Background Radiation", Internet Measurement Conference (IMC'04), Taormina, Italy, pp. 27-40, Oct. 2004.

* cited by examiner

DEMAND MANAGEMENT OF SENDER OF NETWORK TRAFFIC FLOW

BACKGROUND

Computing systems can provide myriads of different types of services over networks, including databases, web applications or "apps," web sites, cloud computing services, software as a service (SaaS) services, and so on. Many services that traditionally have been performed at client computing devices or by computing systems that are exposed just within limited networks have migrated to server computing systems that are accessible over the Internet. While service accessibility over larger-scale networks like the Internet has generally been a boon, a negative effect has been the susceptibility of the computing systems to access by malicious parties that seek to infiltrate the systems to compromise the confidential information that the systems maintain or to gain control of the systems for nefarious reasons, among other objectives.

DETAILED DESCRIPTION

As noted in the background, computing systems that provide services over networks, which are referred to herein as computing services systems, can be susceptible to access by malicious parties that are not legitimate or trusted users of the services. Therefore, network security systems have been developed to reduce the susceptibility of such computing services systems to unauthorized access. Network security systems may attempt to detect potential and actual malicious infiltration of the computing services systems. Other network security systems may seek to analyze the techniques used by malicious parties in their attempts to bypass the existing security of the computing services systems, or to identify the malicious parties, such as by serving as "honeypot" systems masquerading as the computing services systems in order to attract malicious parties.

Both the network security systems and the computing services systems they protect have resources that, while expandable to meet increased demand, are ultimately finite and can potentially be overwhelmed by malicious access attempts. The network security systems, for instance, may not be able to properly respond to a sustained effort by even a relatively small number of malicious access attempts, if the attempts are sufficiently coordinated with one another and/or are relatively sophisticated. Furthermore, no network security system can ever be considered as 100% perfect in its ability to shield their underlying computing services systems from malicious access attempts, which can result in even well designed computing services systems becoming overwhelmed by malicious access attempts.

Techniques described herein lessen the likelihood that existing network security systems and their underlying computing services systems will become overwhelmed by malicious access attempts from known malicious senders as well as from unknown senders who may be potentially malicious. The techniques consider the ability or capacity of the existing network security systems and/or the computing services systems themselves to respond to network traffic as a "supply," with the ability or capacity of senders to maliciously or potentially maliciously access the computing services systems considered as the corresponding "demand." The techniques thus manage the demand of the senders for resources of the existing network security systems and their underlying computing services systems to mitigate the potential for these resources to become exhausted.

For instance, simply dropping sender-initiated network traffic flows, while preserving the supply of the existing network security systems and/or their protected computing services systems, may do little if anything to affect the demand of the senders. This is because the senders' ability or capacity to initiate malicious or potentially malicious access attempts against the computing service systems is not necessarily reduced by dropping their initiated network traffic flows. A network traffic flow in this respect may non-restrictively be considered as including the related network traffic sent from a sender and directed to a computing services system within a given usage session, and the responsive network traffic sent back from the computing services system or the network security system in reply.

In the techniques described herein, a network security system, which can be added upstream to an existing network security system, can manage sender demand by shaping a network traffic flow in responding to the sender, and/or by misinforming the sender in responding to the sender. By shaping the network traffic flow, the network security system can slow the network traffic flow, decreasing the demand of the sender for resources of the existing network security system and the underlying computing services system that it protects. By misinforming the sender, the added network security system can trick the sender to spawn malicious access attempts for which the existing network security system and the computing services system are well equipped, likewise decreasing the demand of the sender for resources of the systems.

Figure 1:
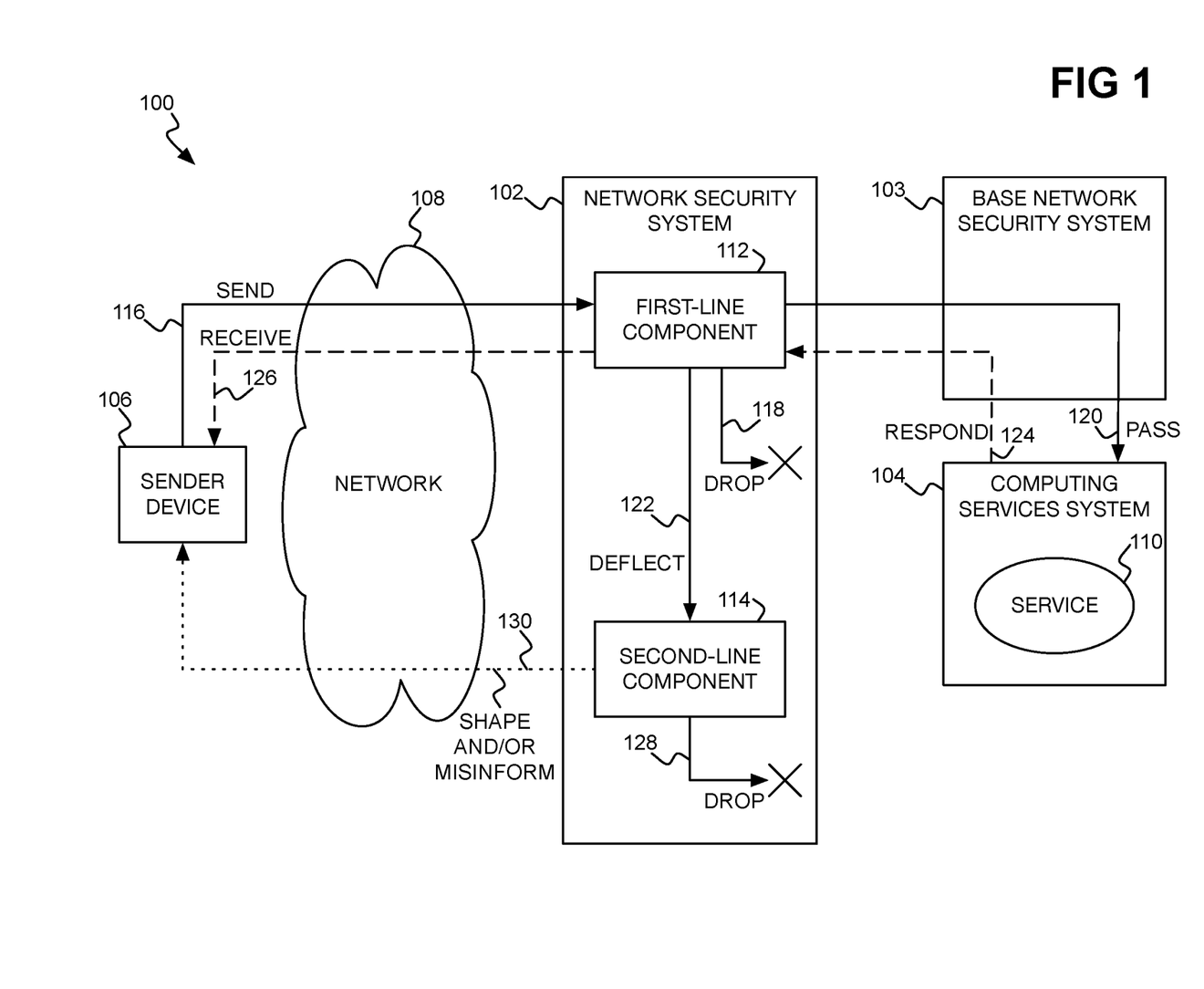
FIG. 1 is a diagram of an example topology by which a network security system can protect a base security system and a computing services system.

FIG. 1 shows an example topology 100 by which an added network security system 102 can protect a base network security system 103 and an underlying computing services system 104 in interacting with a sender device 106 over a network 108. The base network security system 103, if present, may be an existing network security system 103 in relation to which the network security system 102 is placed upstream. The added network security system 102, the existing security system 103, and the computing services system 104 may each be or include one or more server computing devices, for example. The sender device 106 may be a computing device such as a server computing device, a client computing device like a desktop or laptop computer, or another type of computing device. The network 108 may be or include the Internet. The computing service system 104 can provide a service 110 over the network 108 to sender devices like the sender device 106.

The topology 100 is described in relation to a network traffic flow initiated at the sender device 106 and directed to the computing services system 104, as sent by the sender device 106 over the network 108 per the arrow 116. The techniques described herein in relation to the network traffic flow are performed for every network traffic flow initiated by the same or different sender device 106. The network security system 102 receives the network traffic flow on behalf of the computing services system 104. Specifically, a first-line component 112 of the network security system 102 can receive the network traffic flow. Different implementations of the first-line component 112, as well as of a second-line component 114 of the network security system 102, are described later in the detailed description.

The first-line component 112 of the network security system 102 may drop the network traffic flow per arrow 118, pass the network traffic flow to the computing services system 104 per arrow 120, or may deflect the network traffic flow to a second-line component 114 of the network security system 102 per arrow 122. Whether the first-line component 112 drops the network traffic flow or respectively passes or deflects the network traffic flow to the computing services system 104 (via the base network security system 103) or the second-line component 114 is described later in the detailed description. If the first-line component 112 drops the network traffic flow, then no response by the network security system 102 or the computing services system 104 (or the base network security system 103) is made to the sender device 106 in the context of the network traffic flow.

If the first-line component 112 of the network security system 102 passes the network traffic flow to the computing services system 104 (via the base network security system 103), the computing services system 104 may respond to the sender device 106 in the context of the network traffic flow, per dashed arrow 124, in providing the service 110 to the sender device 106, assuming that the base network security system 103 also passes the network traffic flow to the computing services system 104. Such responsive network traffic flow is received by the sender device 106 over the network 108, per dashed arrow 126. In the example of FIG. 1, the responsive network traffic flow is passed (via the base network security system 103) through the network security system 102 generally and through the first-line component 112 thereof more specifically, but in another implementation may be passed directly from the computing services system 104 over the network 108 to the sender device 106.

If the first-line component 112 deflects the network traffic flow to the second-line component 114, then the second-line component 114 may itself drop the network traffic flow, per dotted arrow 128. As in the case when the first-line component 112 drops the network traffic flow, no response by the network security system 102 or the computing services system 104 (or the base network security system 103) is then made to the sender device 106 in the context of the network traffic flow. The second-line component 114 may instead shape the network traffic flow and/or misinform the sender device 106 in responding to the sender device 106 in the context of the network traffic flow, per dotted arrow 130. Whether the second-line component 114 drops the network traffic flow or shapes the network traffic flow and/or misinforms the sender device 106 is described later in the detailed description.

If the second-line component 114 of the network security system 102 shapes the network traffic flow in responding to the sender device 106 in the context of the network traffic flow, it does so to manage the demand of the sender device 106 for resource of the network security system 102, the base network security system 103, and/or the computing services system 104. Such network traffic flow shaping can slow the sender device 106 in sending further network traffic in the context of the same network traffic flow or in sending network traffic when spawning new network traffic flows directed to the computing services system 104. As such, network traffic flow shaping can effectively decrease the demand of the sender using the same or different sender device for resources of the systems 102, 103, and/or 104, as is now described with reference to different example shaping techniques.

As one example, the second-line component 114 may shape the network traffic flow at the application level, which can provide more options for shaping than at the transport protocol level. For example, the secure shell (SSH) protocol has different phases and options that can be manipulated by the second-line component 114 to shape the network traffic flow. The second-line component 114 may arbitrarily close channels, set data transmission windows to small values, claim data integrity violations when there are none, frequently renegotiate keys and/or compression, and so on. In so doing, the sender demand for the resources of the systems 102, 103, and/or 104 is reduced, because the resulting communication with the sender device 106 becomes inefficient.

Consider, for instance, the case in which the sender device 106 is attempting to discover new systems running a particular service, such as remote SSH logon. The network traffic flow received from the sender device 106 may over time include spikes of network traffic when the device 106 is trying to discover whether any parts of the computing services system 104 are running SSH remote logon, interspersing longer periods of lower rates of network traffic when the device is attempting to communicate (e.g., login) with any such discovered parts. In this case, the second-line component 114 may indicate that many if not all network addresses of the computing services system 140 have such open SSH ports, to convince the sender device 106 to move past the discovery phase to the next, login phase. The login phase uses fewer resources of the network security system 102, and thus dynamically shapes the network flow to reduce demand of the sender device 106 for these resources, and further reduces the ability of the device 106 to collect information that the malicious party operating the device 106 can leverage.

In another case, the second-line component 114 may selectively drop the network traffic flow received from the sender device 106 in responding to the sender device 106, to dynamically shape the network traffic flow. The second-line component 114 may drop at least a portion of the network traffic spikes when the sender device 106 is trying to discover whether any parts of the computing services system 104 are running SSH remote logon, but not drop the network traffic occurring at lower rates when the device is attempting to communicate with any such discovered ports. The demand of the sender is decreased, because its ability to discover ports of the computing services system 104 running SSH remote logon is impeded. However, the sender may not cease such discovery attempts, since the network traffic flow is not dropped in its entirety. That is, at a minimum the sender is slowed down, reducing its resources demand, and further the sender may conclude that the information that is being collected is false, and stop its infiltration attempts, which reduces its resources demand even more.

By comparison, if the second-line component 114 were to drop the network traffic flow in its entirety, the sender device 106 may proceed with attempts to discover other types of potential security vulnerabilities of the base network security system 103 or the computing services system 104. In such instance, the demand of the sender for the resources of the network security system 102, the base network security system 103, and/or the computing services system 104 would not be reduced. This is because the systems 102, 103, and/or 104 would still have to engage the sender device 106 in context of network traffic flows encompassing such additional attempts, tying up the processing, network, and other resources of the systems 102, 103, and/or 104.

The network traffic flow can be shaped at the application level for other applications as well. For example, for hypertext transport protocol (HTTP)-based applications, shaping of the network traffic flow similar to that described above in relation to SSH can be performed. For instance, acknowledgments may be dropped, incomplete information may be provided in HTTP responses, responses may not be provided to HTTP GET requests on occasion, and so on. For example, to delay the sender device 106, communications can be placed into an endless series of redirections by returning a 302 status code, which indicates that a resource at a requested universal resource locator (URL) address has been moved to a different URL address. The sender device 106 will then attempt to access the resource at the new URL address, in response to which the device 106 will be redirected back to the original URL address, and so on.

For file transfer protocol (FTP) sessions, false directory structures may be provided, or files may be sent that have no content. For Telnet, false logins may be simulated. For domain name service (DNS) applications, misinformation may be provided. For session initiation protocol (SIP) communications, incoming calls may be permitted to "ring" indefinitely, or may be answered after a long delay and then immediately dropped. Valid SIP phone numbers may be indicated as being invalid if the sender device 106 is known to be malicious. Similarly, invalid SIP phone numbers may be indicated as being valid, and calls to such numbers answered.

Other types of communication can also be manipulated to manage demand of the sender device 106 by causing the sender device 106 to expend more resources. Encrypted or compressed communication may be requested to add overhead at the sender device 106. Encryption keys may be renegotiated often to delay the sender device 106. During such key negotiation, the second-line component 114 may insist on using the same encryption key in lieu of providing a different encryption key. Encryption may further be requested at a higher or lower level than the service 110 of the computing services system 104 actually provides. Similarly, encryption may be specified as being required even if the service 110 does not provide (or does not require) encryption, or encryption may be specified as not being supported when it is supported or even required.

The second-line component 114 may further shape the network traffic flow at the transport protocol level, including, for example, at the transport control protocol (TCP) level, in addition to or in lieu of at the application level. TCP can provide for reliable, ordered, and error-checked data delivery, so long as both the sender and the receiver (e.g., both the sender device 106 and the network security system 102) correctly utilize TCP. However, the second-line component 114 may instead manipulate the TCP so as to cause the sender device 106 to send data much more slowly. The demand of the sender for the resources of the network security system 102, the base network security system 103, and/or the computing services system 104 is therefore reduced, because the rate at which the network traffic flow is received from the sender device 106 is decreased.

For instance, the second-line component 114 may when receiving synchronization (SYN) TCP packets delay responsively sending SYN acknowledgment (ACK) TCP packets back to the sender device 106. The second-line component 114 when receiving data packets delay sending acknowledgment packets to the sender device 106, and occasionally fail to send acknowledgment packets back to the sender device 106. When a data packet is received from the sender 106 that has a particular sequence number, the second-line component 114 may send an acknowledgment packet back that acknowledges a prior or future sequence number. The second-line component 114 may send more than one acknowledgment packet for the same sequence number, and/or acknowledgment packets that are out of order. The second-line component 114 when receiving a data packet may just acknowledge a portion of the packet, such as just the first few bytes, or may advertise a small TCP window to the sender device 106. The second-line component 114 may stop responding to TCP packets after a TCP session has been established without formally resetting the TCP session, to persist the session as long as possible. The second-line component 114 may reset the TCP connection, periodically or even constantly.

Network traffic shaping at protocols other than TCP can also be performed. For example, network traffic shaping may occur at the user diagram protocol (UDP) level. Multiple copies of the same packet may be sent, the packets may be sent out of order, the packets may be intentionally dropped, and so on, in this case. If a service employs a higher-level protocol that provides error correction of the application level, such as the quick UDP Internet connections (QUIC) protocol, a large number of the underlying UDP packets can be dropped to force retransmission at the application level. The QUIC protocol is an example of an application protocol above the TCP and/or UDP level.

Additionally, for unfamiliar or unknown protocols, techniques similar to those described above can be employed. For instance, connections may be persisted, but the data received over those connections dropped. As such, the sender device 106 continues to send data, to which no replies are made. The sender device 106 may at some point stop sending data, due to an expectation that a reply should be received from a service that actually does not exist. The second-line component 114 may periodically issue an acknowledgment to trigger retransmission by the sender device 106, even if the data was previously acknowledged.

As a third example, the second-line component 114 may engage in network traffic flow shaping at both the protocol and application levels. The second-line component 114 may, for instance, always engage in shaping at the transport protocol level, and selectively engage in shaping at the application level for specific applications. The second-line component 114 may engage in network traffic flow shaping in other ways as well, in addition to and/or in lieu of the examples that have been described.

If the second-line component 114 additionally or instead misinforms the sender device 106 in responding to the sender device 106 in the context of the network traffic flow, it likewise does so to manage the demand of the sender device 106 for resources of the network security system 102, the base network security system 103, and/or the computing services system 104. Such sender misinformation can confuse or trick the sender device 106 in how the device 106 sends further network traffic in the context of the same network traffic flow or how the device 106 sends network traffic in spawning new network traffic flows directed to the computing services system 104. Sender misinformation can effectively decrease the demand of the sender using the same or different sender device for resources of the systems 102, 103, and/or 104, as is now described with reference to different example misinformation techniques.

As one example, the second-line component 114 may in masquerading as the computing services system 104 respond to the sender device 106 as a different type of the computing services system. That is, the second-line component 114 may respond to the sender device 106 as if the network security system 102 were a type of computing services system different than the computing services systems 104. For instance, the second-line component 114 may simulate a lower version of an application than that which the computing services system 104 is running, or an entirely different application than that which the computing services system 104 is running.

In one implementation, the second-line component 114 masquerades as the computing services system 104 via the first-line component 112 first determining that the sender device 106 should not be permitted to send traffic to the system 104. The first-line component 112 thus redirects the network traffic to the second-line component 114. The first-line component 112 may be an intelligent network switch in this respect, and make this determination by itself. Additionally or alternatively, the first-line component 112 may receive feedback from the second-line component 114 as to which senders to block from accessing the computing services system 104.

As another example of sender misinformation, the second-line component 114 may advertise computing services system information different than the actual information regarding the computing services system 104. For instance, the second-line component 114 may advertise open network ports different than those that the computing services system 104 actually has open, application versions different than the versions of the applications that the computing services system 104 is actually running, and so on. The second-line component 114 may engage in sender misinformation in other ways as well, in addition to and/or in lieu of the examples that have been described.

Such sender misinformation reduces sender demand for the resources of the network security system 102, the base network security system 103, and/or the computing services system 104. For instance, if the network security system 102 were not to misinform the sender, then the sender may spawn new network traffic flows at the sender device 106 or at a different device using the correct information. If such network traffic flows are able to bypass the network security system 102 (and the base network security system 103) and reach the computing services system 104, then resources are tied up in responding to the network traffic flows. By comparison, if the sender is misinformed, then subsequently launched network traffic flows are less likely to tie up the resources of the computing services system 104, because the system 104 may simply ignore them, or such network traffic flows may never reach the system 104.

Figure 2A:
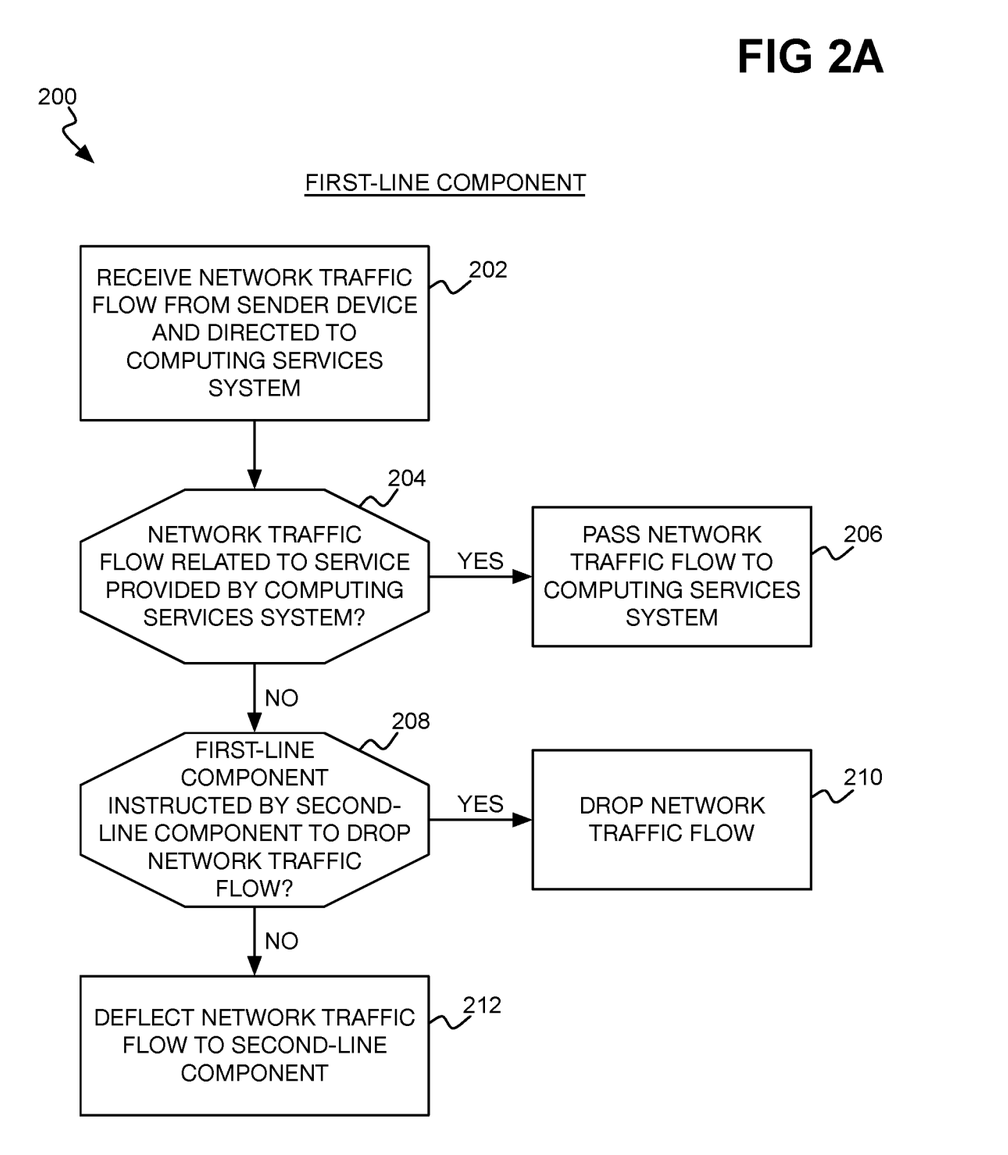
FIGS. 2A, 2B, and 2C are flowcharts of example methods for protecting a computing services system.
Figure 2B:
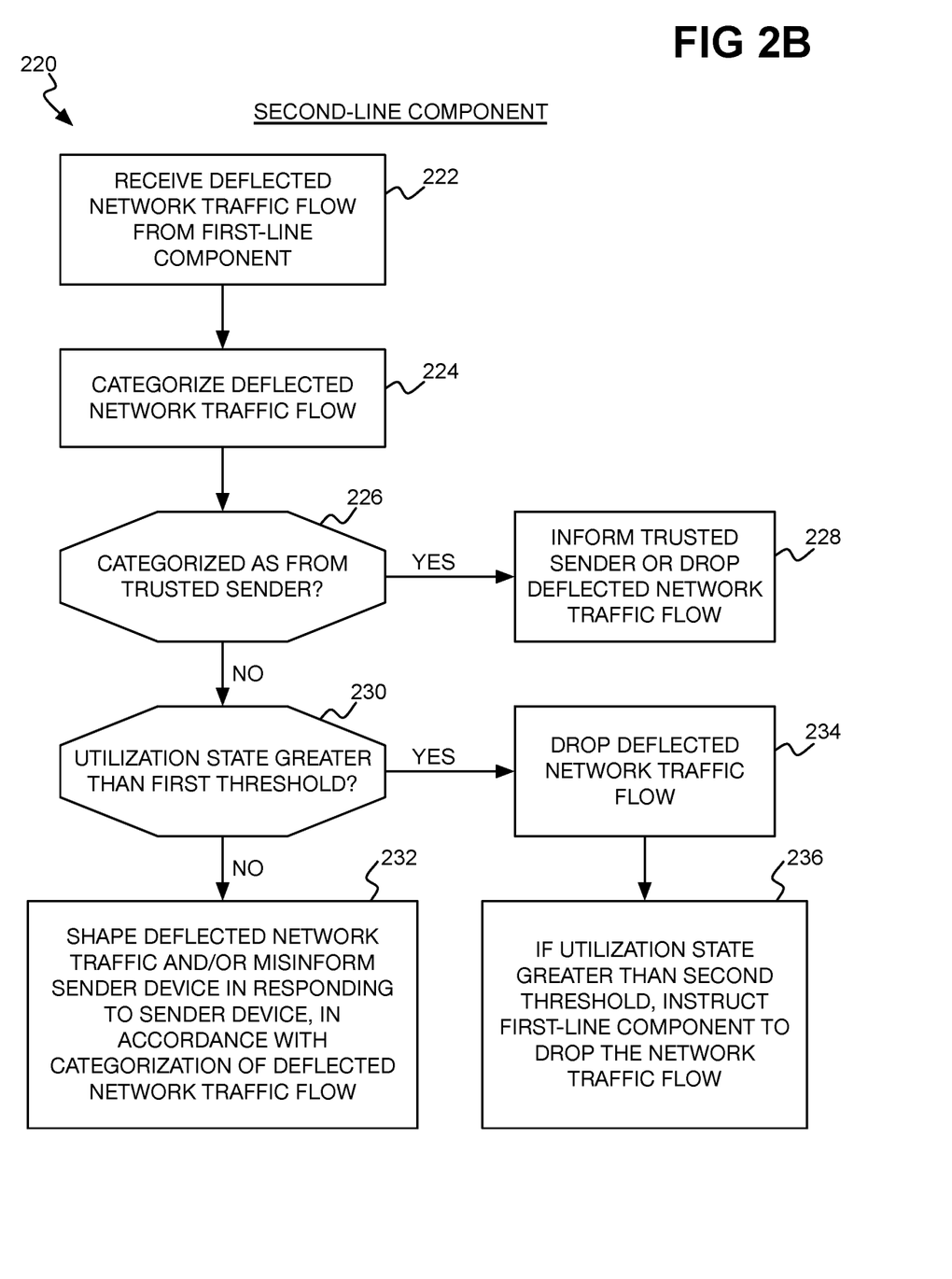
Figure 2C:
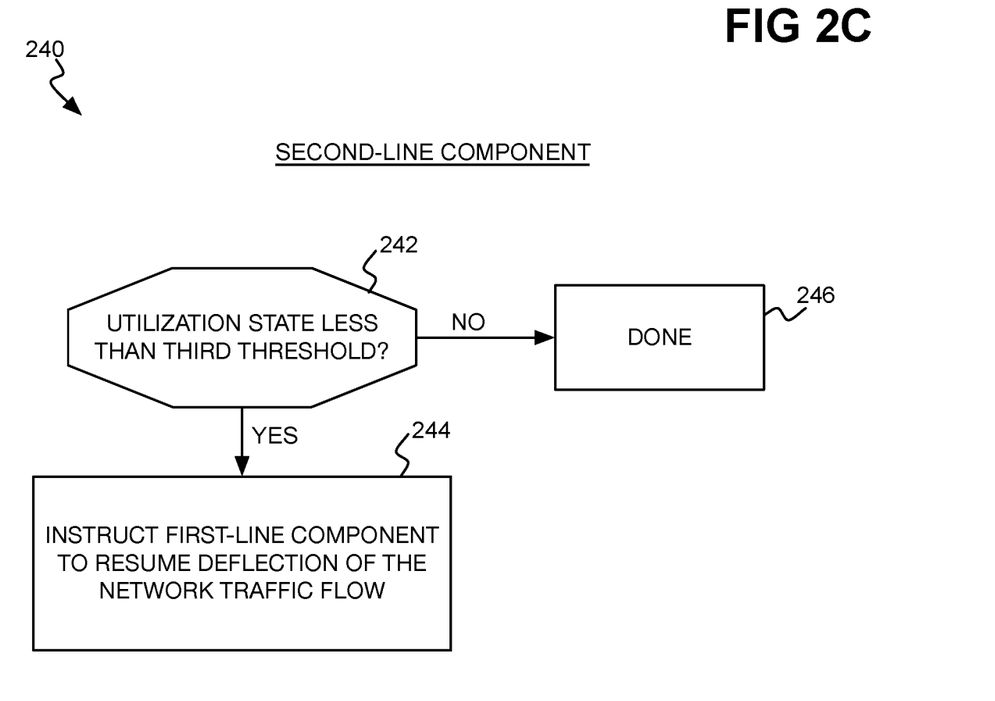

FIGS. 2A, 2B, and 2C respectively show example methods 200, 220, and 240 for protecting the computing services system 104 by reducing sender demand for the resources of the computing services system 104, the base network security system 103, or the network security system 102 performing the methods 200, 220, and 240. The first-line component 112 may perform the method 200 of FIG. 2A, the second line-component 114 may perform the method 220 of FIG. 2B, and either component 112 or 114 or a different component of the network security system 102 may asynchronously perform the method 240 of FIG. 2C. The methods 200, 220, and 240 may each be implemented as program code stored on a non-transitory computer-readable data storage medium and executed by a processor of the network security system 102.

Referring first to FIG. 2A, the first-line component 112 performs the method 200 on a per-network traffic flow basis, as network traffic flows are received. Therefore, responsive to receiving the network traffic flow (202) from the sender device 106 over the network, the first-line component 112 can determine whether the network traffic flow in question relates to the service 110 that the computing systems service 104 provides (204). For instance, the first-line component 112 may inspect the packets making up the network traffic flow to determine the service. If the network traffic flow relates to the service 110 provided by the computing services system 104 (204), then the first-line component 112 may pass the network traffic flow to the computing services system 104 (via the base network security system 103) for processing (206).

However, if the network traffic flow does not relate to the provided service 110 (204), then the network traffic flow may be malicious or potentially malicious. That is, the determination performed in part 204 may be considered as an example of determining whether the network traffic flow is malicious or potentially malicious, or not. If the second-line component 114 had previously instructed the first-line component 112 to drop the network traffic flow in question (208), as described in more detail in reference to FIG. 2B below, then the first-line component 112 drops the network traffic flow (210). Otherwise, the first-line component 112 deflects the network traffic flow to the second-line component 114 (212).

Referring next to FIG. 2B, the second-line component 114 performs the method 220 each time the first-line component 112 deflects a network traffic flow to the second-line component 114. Therefore, the second-line component 114 receives the deflected network traffic flow from the first-line component 112 (222). The second-line component 114 may categorize the deflected network traffic flow in one of a number of different network traffic categories (224). For example, the second-line component 114 may categorize the network traffic flow based on the identity of the sender device 106, such as its Internet protocol (IP) address. The second-line component 114 may categorize the network traffic flow as originating from a trusted sender, or not. In the latter case, the second-line component 114 may further categorize the network traffic flow as originating from an unknown sender, or from a known malicious (including a known potentially malicious) sender. The second-line component 114 may additionally or instead categorize the network traffic flow in other ways as well.

If the network traffic flow is categorized as originating from a trusted sender (226), then the second-line component 114 may inform the trusted sender that it is sending network traffic unrelated to the service 110 that the computing services system 104 provides, or may simply drop the deflected network traffic flow (228). For example, the sender device 106 may be misconfigured, resulting in the device 106 sending network traffic unrelated to the provided service 110. The second-line component 114 thus does not shape the demand of the sender in part 228.

If the network traffic flow is categorized as not originating from a trusted sender, then the network traffic flow may be considered as potentially malicious, and how the second-line component 114 responds can be dictated based on the utilization state of the network security system 102. The utilization state of the network security system 102 can correspond to the current utilization of its resources, which may be measured by the number of network traffic flows that the network security system 102 is currently actively handling (i.e., that are in an open state). More specifically, how the second-line component 114 responds can be dictated based on the current utilization state of the network security system 102 in relation to a first threshold (230). If the categorization of the network traffic flow delineates between unknown senders and known malicious or potentially malicious senders, then the first threshold may be different for each of these categories. The first threshold may be dynamic, and not static, and thus specified programmatically, algorithmically, or via a model that predicts when the network security system 102 is likely to become overloaded.

If the utilization state of the network security system 102 is not greater than the first threshold, then the second-line component 114 may shape the deflected network traffic flow and/or misinform the sender device 106 (232), as has been described above. That is, the network security system 102 still has sufficient resources to actively deflect the network traffic flow and/or misinform the sender device 106. How or whether the second-line component 114 shapes the deflected network traffic flow and/or misinforms the sender device 106 can be in accordance with the category in which the network traffic flow has been categorized. For instance, the second-line component 114 may more aggressively shape the deflected network traffic flow and/or misinform the sender device 106 for known malicious or potentially malicious senders than for unknown senders.

If the utilization state of the network security system 102 is greater than the first threshold, however, then the second-line component 114 may drop the deflected network traffic flow (234). In this case, the network security system 102 may not have sufficient resources to actively deflect the network traffic flow and/or misinform the sender device 106 because, for instance, the network security system 102 is actively engaged in sender demand management as to other network traffic flows. The second-line component 114 thus does not shape the deflected network traffic flow and does not misinform the sender device 106 in part 234.

The resources of the network security system 102 may further be close to running out, which may be determined by comparing the utilization state of the network security system 102 to a second threshold greater than the first threshold. Like the first threshold, the second threshold may be different for different categories of network traffic flows. If the utilization state of the network security system 102 is greater than the second threshold, then the second-line component 114 may instruct the first-line component to drop the network traffic flow (236). That is, upon receiving subsequent network traffic that is part of the same network traffic flow, the first-line component 112 drops the network traffic flow further upstream, in part 210 of FIG. 2A as has been described, to further conserve resources of the network security system 102.

The resources are further conserved because the first-line component 112 does not have to deflect the network traffic flow to the second-line component 114, and the second-line component 114 does not have to perform the method 220 of FIG. 2B any further as to the network traffic flow. The first-line component 112 may continue dropping the network traffic flow in question until the utilization state of the network security system 102 falls below a third threshold lower than the second threshold, which may be lower or higher than the first threshold. As with the first and second thresholds, the third threshold may be different for different categories of network traffic flows.

Therefore, referring to FIG. 2C, the network security system 102 may asynchronously perform the method 240 once the second-line component 114 has instructed the first-line component 112 to drop the network traffic flow instead of deflecting the network traffic flow to the second-line component 114. Specifically, if the utilization state of the network security system 102 is less than the third threshold (242), then the first-line component 112 is instructed to resume deflection of the network traffic flow to the second-line component 114 in part 210 of FIG. 2B (244). If the utilization state is not less than the third threshold (244), then no such instruction is provided, and the first-line component 112 continues dropping the network traffic flow (246).

Figure 3:
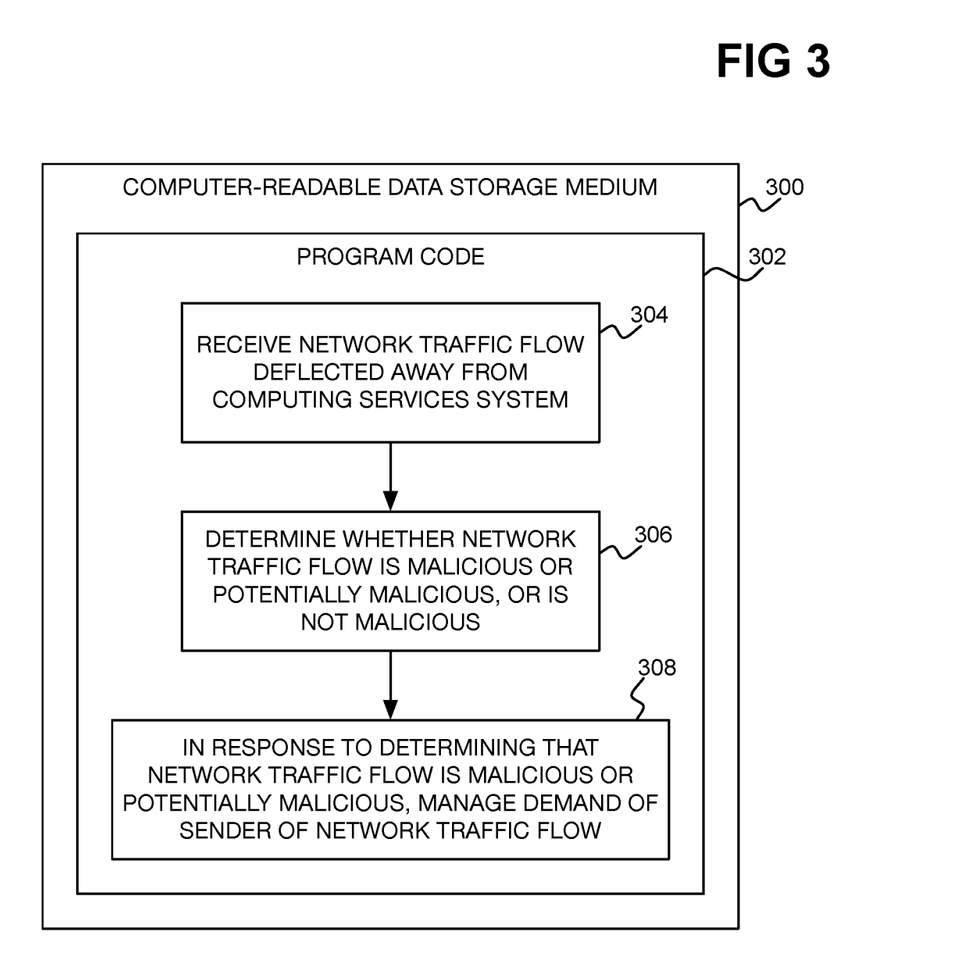
FIG. 3 is a diagram of an example computer-readable data storage medium.

FIG. 3 shows an example non-transitory computer-readable data storage medium 300. The computer-readable data storage medium 300 stores program code 302 executable by a network security system, such as by the second-line component 114 of the network security system 102 of FIG. 1, to perform processing. The processing includes receiving a network traffic flow deflected away from a computing services system providing a service (304). The network traffic flow is sent from a sender, such as a device of the sender, and directed to the computing services system.

The processing includes determining whether the network traffic flow is not malicious, or is malicious or potentially malicious (306). The network traffic flow may not be malicious, for instance, if it originates from a trusted sender whose devices happen to be misconfigured, as noted above. The network traffic flow may be potentially malicious (including malicious) if it originates from an unknown sender or a known malicious sender, as has also been noted above. The processing includes, in response to determining that the network traffic flow is malicious or potentially malicious, managing demand of the sender by shaping the deflected network traffic flow in responding to the sender and/or by misinforming the sender in responding to the sender (308).

Figure 4:
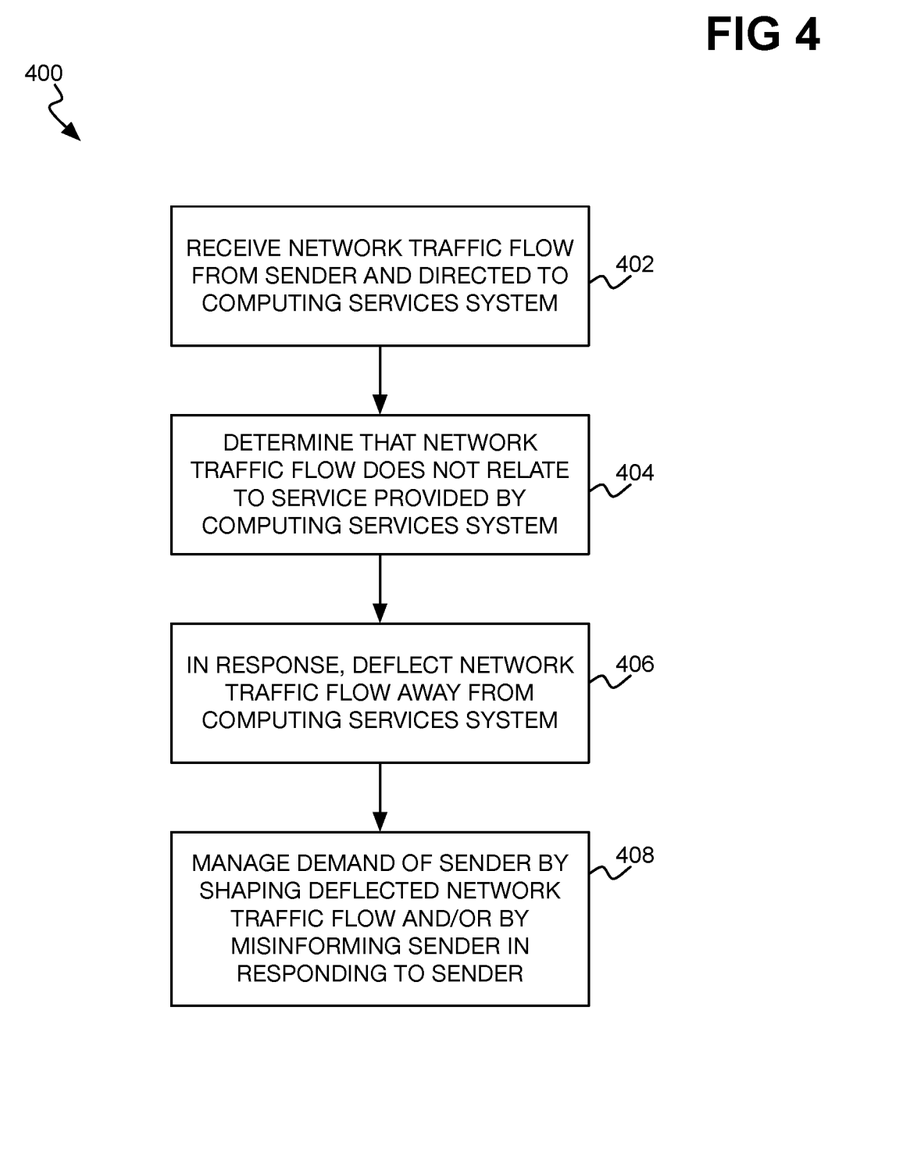
FIG. 4 is a flowchart of an example method.

FIG. 4 shows an example method 400. The method 400 may be performed by a network security system, such as by the network security system 102 of FIG. 1. The method 400 includes receiving a network traffic flow from a sender and directed to a computing services system providing a service (402). The method 400 includes, in response to determining that the network traffic flow does not relate to the service (404), deflecting the network traffic flow away from the computing services system (406). The method 400 includes managing demand of the sender by shaping the deflected network traffic flow in responding to the sender and/or by misinforming the sender in responding to the sender (408).

Figure 5A:
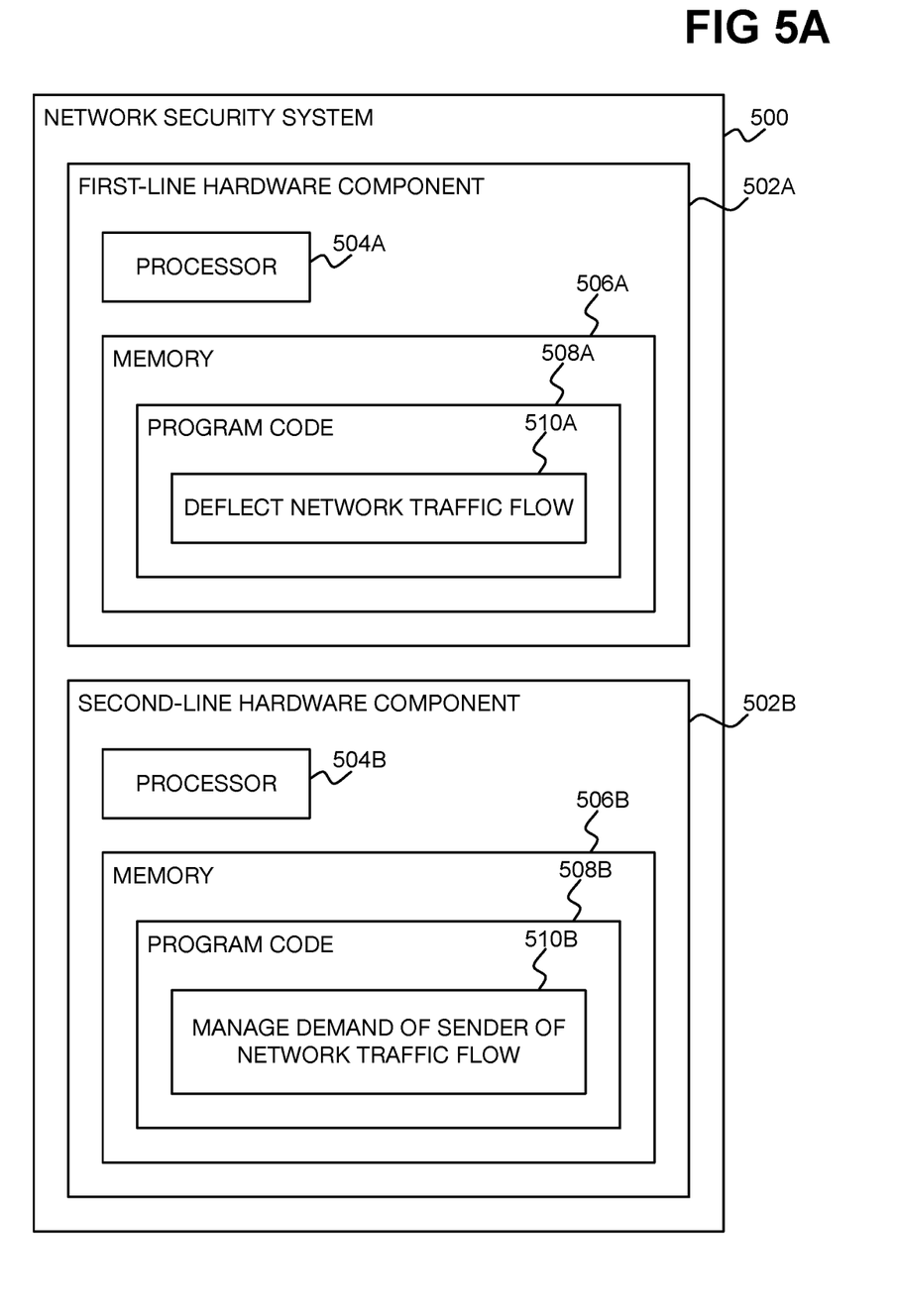
FIGS. 5A and 5B are diagrams of example network security systems.
Figure 5B:
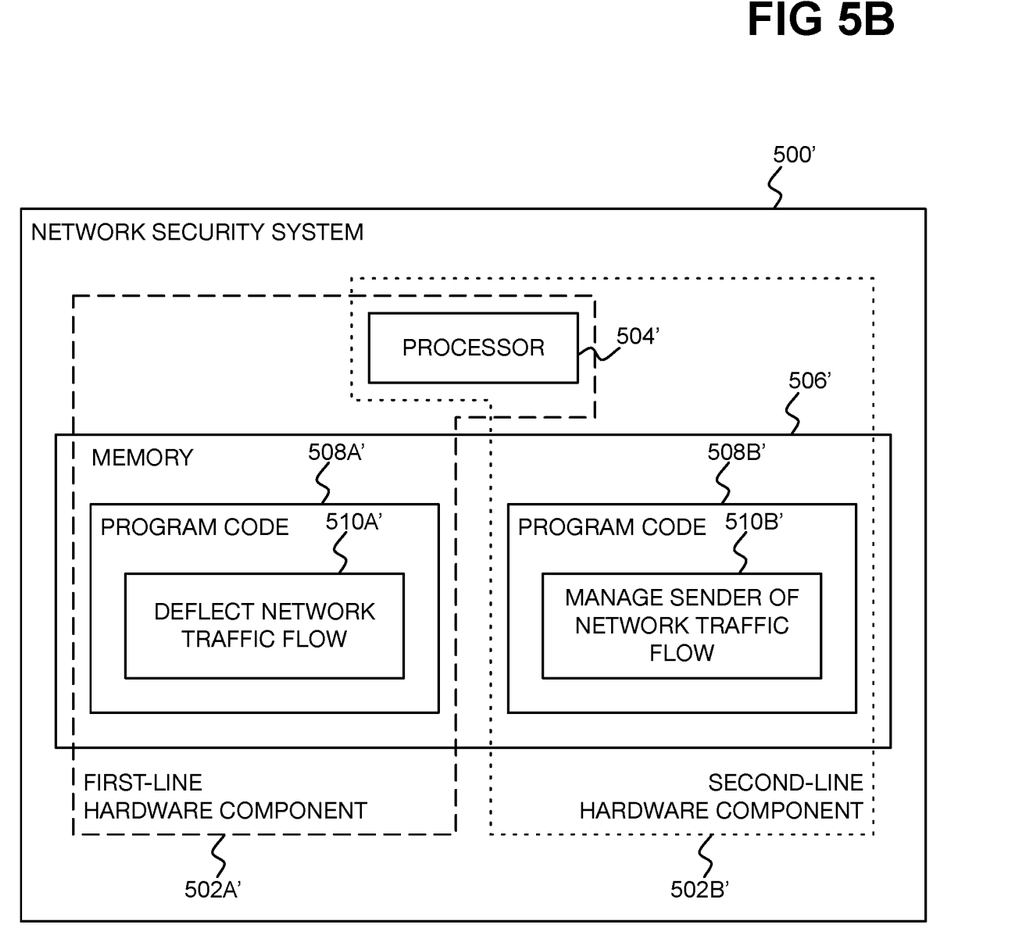

FIGS. 5A and 5B respectively show different example network security systems 500 and 500'. The network security system 500 of FIG. 5A includes a first-line hardware component 502A to deflect a network traffic flow away from a computing services system to which the network traffic flow was directed (510A). The network traffic flow is unrelated to the service. The network security system 500 includes a second-line hardware component 502B to manage demand of a sender of the network traffic flow by shaping the deflected network traffic flow in responding to the sender and/or by misinforming the sender in responding to the sender (510B).

In the example of FIG. 5A, the first-line hardware component 502A is implemented as a processor 504A and a memory 506A storing program code 508A executable by the processor 504A to perform processing 510A. The second-line hardware component 502B is implemented as a separate processor 504B and a separate memory 506B storing program code 508B executable by the processor 504B to perform processing 510B. The hardware components 502A and 502B may thus be implemented as different discrete devices, such as different discrete computing or network devices, which may be communicatively connected to one another over an internal or secure network.

The network security system 500' of FIG. 5B likewise includes a first-line hardware component 502A' to deflect a network traffic flow away from a computing services system to which the network traffic flow was directed (510A'). The network traffic flow is unrelated to the service. The network security system 500' likewise includes a second-line hardware component 502B' to manage demand of a sender of the network traffic flow by shaping the deflected network traffic flow in responding to the sender and/or by misinforming the sender in responding to the sender (510B').

In the example of FIG. 5B, the hardware components 502A' and 502B' are implemented as a shared or common processor 504' and a shared or common memory 506'. The memory 506' stores both the program code 508A' of the first-line hardware component 502A' that is executable by the processor 504' to perform processing 510A', and the program code 508B' of the second-line hardware component 502B' that is executable by the processor 504' to perform processing 510B'. The hardware components 502A' and 502B' may thus be integrated within a single device, such as a discrete computing or network device.

Techniques have been described for managing sender demand for resources of a network security system, a base network security system, and/or a computing services system that the network security system protects. The demand of the sender may be managed by shaping network traffic flows originating at the sender and/or by misinforming the sender in responding to the sender in conjunction with the network traffic flows. By performing such sender demand management, the likelihood that the resources of the network security system, the base network security system, and/or the computing services system will become exhausted is reduced if not eliminated.

We claim:

1. A method comprising:
    receiving, by a first-line component of a network security system, an initial portion of a network traffic flow from a sender and directed to a computing services system providing a service;
    in response to determining that the network traffic flow does not relate to the service, deflecting, by the first-line component, the network traffic flow away from the computing services system and to a second-line component of the network security system prior to the second-line component determining whether the network traffic flow is not malicious, or is malicious or potentially malicious;
    in response to the second-line component determining that the network traffic flow is malicious or potentially malicious, determining, by the second-line component, a utilization state of the network security system;
    in response to determining that the utilization state is greater than a first threshold but less than a second threshold, managing, by the second-line component, demand of the sender in response to receiving a subsequent portion of the network traffic flow deflected by the first-line component to the second-line component by dropping the subsequent portion of the network traffic flow at the second-line component; and
    in response to determining that the utilization state is greater than the second threshold, managing, by the second-line component, the demand of the sender by causing the subsequent portion of the network traffic flow to be dropped at the first-line component instead of being deflected to the second-line component.

2. The method of claim 1, wherein the demand of the sender comprises sender demand for resources of a base network security system in relation to which the network security system is upstream.

3. The method of claim 1, further comprising:
    in response to determining that the utilization state is less than the first threshold, managing, by the second-line component, the demand of the sender in response to receiving the subsequent portion of the network traffic flow deflected by the first-line component to the second line component without dropping the subsequent portion of the network traffic flow and by shaping the deflected subsequent portion of the network traffic flow in responding to the sender.

4. The method of claim 3, wherein shaping the deflected subsequent portion of the network traffic flow comprises either or both of:
    manipulating the deflected subsequent portion of the network traffic flow at an application level to reduce communication efficiency from the sender; and
    shaping the deflected subsequent portion of the network traffic flow as the network traffic flow pertains to a remote secure shell (SSH) service, a hypertext transport protocol (HTTP)-based application, a file transfer protocol (FTP) session, a session initiation protocol (SIP) communication session, and/or a communication encryption service.

5. The method of claim 1, further comprising:
    in response to determining that the utilization state is less than the first threshold, managing, by the second-line component, the demand of the sender in response to receiving the subsequent portion of the network traffic flow deflected by the first-line component to the second line component without dropping the subsequent portion of the network traffic flow and by misinforming the sender in responding to the sender.

6. The method of claim 5, wherein misinforming the sender in responding to the sender comprises responding to the sender as if the network security system were a type of computing services system different than the computing services system providing the service.

7. The method of claim 5, wherein misinforming the sender in responding to the sender comprises advertising computing services system information different than information regarding the computing services system providing the service.

8. A non-transitory computer-readable data storage medium storing program code executable by a second-line component of a network security system to perform processing comprising:
    receiving an initial portion of a network traffic flow deflected by a first-line component of the network security system away from a computing services system providing a service and to the second-line component responsive to the first-line component determining that the network traffic flow does not relate to the service, the network traffic flow sent from a sender and directed to the computing services system, the network traffic flow deflected by the first-line component to the second-line component before the second-line component determining whether the network traffic flow is not malicious, or is malicious or potentially malicious;
    in response to determining that the deflected network traffic flow is malicious or potentially malicious, determining a utilization state of the network security system;

in response to determining that the utilization state is greater than a first threshold but less than a second threshold, managing demand of the sender in response to receiving a subsequent portion of the network traffic flow deflected by the first-line component to the second-line component by dropping the subsequent portion of the network traffic flow at the second-line component; and in response to determining that the utilization state is greater than the second threshold, managing the demand of the sender by causing the subsequent portion of the network traffic flow to be dropped at the first-line component instead of being deflected to the second-line component.

9. A network security system comprising:

a first-line hardware component; and a second-line hardware component, wherein the first-line component is to:

receive an initial portion of a network traffic flow from a sender and directed to a computing services system providing a service; and in response to determining that the network traffic flow does not relate to the service, deflect the network traffic flow away from the computing services system and to a second-line component of the network security system prior to the second-line component determining whether the network traffic flow is not malicious, or is malicious or potentially malicious, and wherein the second-line component is to:

in response to determining that the network traffic flow is malicious or potentially malicious, determine a utilization state of the network security system;

in response to determining that the utilization state is greater than a first threshold but less than a second threshold, manage demand of the sender in response to receiving a subsequent portion of the network traffic flow deflected by the first-line component to the second-line component by dropping the subsequent portion of the network traffic flow at the second-line component; and in response to determining that the utilization state is greater than the second threshold, manage the demand of the sender by causing the subsequent portion of the network traffic flow to be dropped at the first-line component instead of being deflected to the second-line component.

10. The network security system of claim 9, wherein the first-line hardware component comprises a first processor and first memory storing first program code executable by the first processor to deflect the network traffic flow, and wherein the second-line hardware component comprises a second processor and second memory storing second program code executable by the second processor to manage the demand of the sender.

11. The non-transitory computer-readable data storage medium of claim 8, wherein the processing further comprises:

in response to determining that the utilization state is less than the first threshold, managing the demand of the sender in response to receiving the subsequent portion of the network traffic flow deflected by the first-line component to the second line component without dropping the subsequent portion of the network traffic flow.

12. The non-transitory computer-readable data storage medium of claim 11, wherein the demand of the sender is managed by shaping the deflected subsequent portion of the network traffic flow.

13. The non-transitory computer-readable data storage medium of claim 12, wherein shaping the deflected subsequent portion of the network traffic comprises:

manipulating the deflected subsequent portion of the network traffic flow at an application level to reduce communication efficiency from the sender.

14. The non-transitory computer-readable data storage medium of claim 12, wherein shaping the deflected subsequent portion of the network traffic comprises:

shaping the deflected subsequent portion of the network traffic flow as the network traffic flow pertains to a remote secure shell (SSH) service, a hypertext transport protocol (HTTP)-based application, a file transfer protocol (FTP) session, a session initiation protocol (SIP) communication session, and/or a communication encryption service.

15. The non-transitory computer-readable data storage medium of claim 11, wherein the demand of the sender is managed by misinforming the sender in responding to the sender.

16. The non-transitory computer-readable data storage medium of claim 15, wherein misinforming the sender comprises:

responding to the sender as if the network security system were a type of computing services system different than the computing services system providing the service.

17. The non-transitory computer-readable data storage medium of claim 15, wherein misinforming the sender comprises:

advertising computing services system information different than information regarding the computing services system providing the service.

18. The non-transitory computer-readable data storage medium of claim 8, wherein the demand of the sender is managed by causing the subsequent portion of the network traffic flow to be dropped at the first-line component instead of being deflected to the second-line component until the utilization state falls below a third threshold lower than the second threshold.

19. The network security system of claim 9, wherein the second-line component is further to:

in response to determining that the utilization state is less than the first threshold, manage the demand of the sender in response to receiving the subsequent portion of the network traffic flow deflected by the first-line component to the second line component without dropping the subsequent portion of the network traffic flow.

20. The network security system of claim 19, wherein the demand of the sender is managed by shaping the deflected subsequent portion of the network traffic flow.

\* \* \* \* \*